United States Patent
Laska et al.

(10) Patent No.: US 9,131,041 B2
(45) Date of Patent: Sep. 8, 2015

(54) USING AN AUXILIARY DEVICE SENSOR TO FACILITATE DISAMBIGUATION OF DETECTED ACOUSTIC ENVIRONMENT CHANGES

(71) Applicant: RESEARCH IN MOTION LIMITED, Waterloo (CA)

(72) Inventors: Brady Nicholas Laska, Arnprior (CA); Chris Forrester, Kitchener (CA); Malay Gupta, Canton, IL (US); Sylvain Angrignon, Kanata (CA); Michael Tetelbaum, Ottawa (CA); James David Gordy, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 390 days.

(21) Appl. No.: 13/656,298

(22) Filed: Oct. 19, 2012

(65) Prior Publication Data

US 2014/0112487 A1    Apr. 24, 2014

(51) Int. Cl.
*H04R 3/00* (2006.01)
*H04M 9/08* (2006.01)
*H04R 1/40* (2006.01)

(52) U.S. Cl.
CPC .............. *H04M 9/082* (2013.01); *H04R 1/406* (2013.01); *H04R 3/005* (2013.01); *H04R 2201/40* (2013.01); *H04R 2203/12* (2013.01)

(58) Field of Classification Search
CPC ............ H04B 3/20; H04B 15/00; H04B 3/23; H04R 27/00; H04R 3/005; H04R 1/406
USPC .......................................... 381/66, 92, 83, 93
See application file for complete search history.

(56) References Cited

U.S. PATENT DOCUMENTS

| 7,724,892 | B2 | 5/2010 | Dedieu et al. |
| 2010/0081487 | A1 | 4/2010 | Chen et al. |
| 2011/0286615 | A1* | 11/2011 | Olodort et al. ............ 381/311 |

(Continued)

FOREIGN PATENT DOCUMENTS

| JP | 2007072351 A | 3/2007 |
| JP | 2011066668 A | 3/2011 |
| WO | 20100092523 A1 | 8/2010 |
| WO | 2011076290 A1 | 6/2011 |

OTHER PUBLICATIONS

U.S. Appl. No. 13/229,268, filed Sep. 9, 2011.

(Continued)

*Primary Examiner* — Disler Paul
(74) *Attorney, Agent, or Firm* — Fish & Richardson P.C.

(57) ABSTRACT

Audio input may be received at one or more microphones of a mobile device. Based on the audio input, a change in an acoustic environment of the device, such as a change in a direction of arrival of the audio input or a degradation in a quality of acoustic echo cancellation being performed upon the audio input, may be detected. A determination may be made that the detected change coincides with a non-acoustic physical event detected using an auxiliary sensor at the mobile device. The event may for example be device motion, a new proximate object, a change in a proximity of an object, a new heat source or a change in a heat level from a known heat source. Based on the determining, a signal processor, possibly comprising an audio beamformer or echo canceller, may be recalibrated, e.g. the audio beamformer or echo canceller may be caused to reconverge.

18 Claims, 9 Drawing Sheets

(56) References Cited

U.S. PATENT DOCUMENTS

| | | |
|---|---|---|
| 2011/0311066 A1* | 12/2011 | Nagy .............................. 381/66 |
| 2012/0182429 A1* | 7/2012 | Forutanpour et al. ......... 348/175 |
| 2012/0188371 A1 | 7/2012 | Chen et al. |
| 2013/0083944 A1* | 4/2013 | Kvist et al. ..................... 381/92 |
| 2013/0121498 A1* | 5/2013 | Giesbrecht ...................... 381/66 |
| 2013/0190041 A1* | 7/2013 | Andrews et al. ........... 455/556.1 |

OTHER PUBLICATIONS

Extended European Search report mailed Sep. 16, 2013, in corresponding European patent application No. 13155677.1.

English abstract for JP2007072351; published on Mar. 22, 2007 and retrieved on Sep. 19, 2013.

English abstract for JP2011066668; published on Mar. 31, 2011 and retrieved on Sep. 19, 2013.

* cited by examiner

USING AN AUXILIARY DEVICE SENSOR TO FACILITATE DISAMBIGUATION OF DETECTED ACOUSTIC ENVIRONMENT CHANGES

TECHNICAL FIELD

This disclosure pertains to the use of an auxiliary sensor of a mobile device, such as a motion sensor of a smartphone for example, to facilitate disambiguation of detected acoustic environment changes at the mobile device. In addition, or alternatively, the auxiliary sensor is used help determine whether an audio signal processor should be recalibrated.

BACKGROUND

A mobile electronic device (or simply "mobile device"), such as a smartphone, tablet computer, cordless telephone, handheld two-way radio, digital audio recorder, or other device, may maintain a model of its acoustic environment. The term "acoustic environment" may refer to the location, in relation to a microphone array at the mobile device for example, of audio sources in a physical space in which the mobile device is situated. The location of each audio source may be represented as a direction or angle of arrival of the audio from the source relative to the microphone array. The term "acoustic environment" may alternatively, or in conjunction, refer to the location of reflecting surfaces within the physical space that may reflect sound and thereby cause acoustic echoes. This may be represented at the device as an acoustic path between an audio source (e.g. a speaker of the mobile device) and a microphone of the device.

A model of the acoustic environment may be used by the mobile device for various purposes. For example, a model of the location of one or more audio sources in the physical space relative to the device, may be used to facilitate beamforming. Beamforming generally refers to a signal processing technique used for directional signal reception by sensor arrays. In the case of audio, this is achieved by combining signals from the microphones comprising the array in such a way that desired signals at particular angles experience constructive interference while undesired signals experience destructive interference. In this manner, a desired audio source (e.g. a device user who is actively speaking) may be enhanced while undesired audio sources (e.g. other persons or background noise) may be attenuated or cancelled.

In another example, a model of the reflecting surfaces of the physical space may be used to facilitate echo cancellation. The term "echo cancellation" as used herein refers to the removal of an acoustic echo, such as the reflection of sound waves by surfaces in a physical space in which the mobile device is situated, via signal processing. For instance, when a remote talker's voice is played through the device speaker and bounces off a surface near the device, such as a proximate wall or the face of the user holding the device to his or her ear, an acoustic echo may be created. This acoustic echo may be received at the microphone of the mobile device. Cancellation of such an acoustic echo at the device may be desirable to avoid transmitting it back to the remote talker, who may consider it distracting to hear his or her own voice after a slight round-trip transmission delay. An acoustic echo can be removed at the mobile device by first identifying duplicated sounds (echo) in received audio input then "subtracting" those duplicate sounds from the received audio input. This technique may be implemented using a digital signal processor (DSP) hardware and/or software for example.

DETAILED DESCRIPTION

Figure 1:
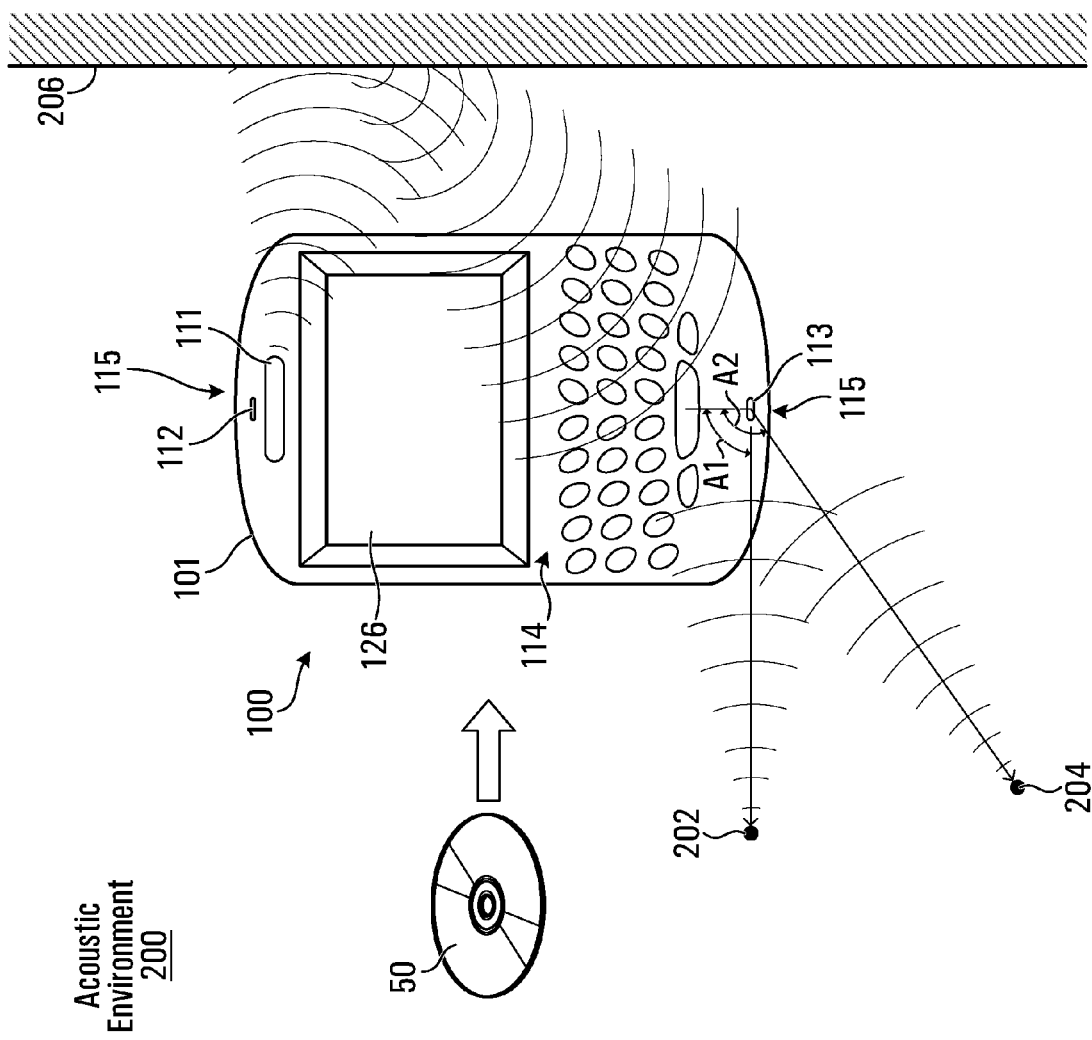
FIG. 1 is a schematic diagram of an exemplary embodiment of a mobile device in an acoustic environment.

The embodiments set forth below represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable medium or media for storage of information, such as machine or computer-readable instructions, data structures, program modules, or other data. A non-exhaustive list of examples of computer-readable media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, Random Access Memory (RAM), Read-Only Memory (ROM), Electrically Erasable Programmable Read-Only Memory (EEPROM), flash memory or other memory technology. Any such computer storage media may be part of the device or accessible or connectable thereto. Any application or module herein described may be implemented using computer-readable/executable instructions that may be stored or otherwise held by such computer readable storage media.

In this document (both hereinabove and hereinbelow), the term "exemplary" is understood to mean "an example of" and does not necessarily connote that the example is preferred or exceptional in any way.

In one aspect of the present disclosure, there is provided a method of steering an audio beamformer of a mobile device, the method comprising: based on audio input received at a microphone array of the mobile device, detecting a change in a direction of arrival of the audio input; determining that the change in the direction of arrival of the audio input coincides with a non-acoustic physical event detected using an auxiliary sensor at the mobile device; and based on the determining, steering the audio beamformer in the changed direction of arrival of the audio input.

In another aspect of the present disclosure, there is provided a method of performing acoustic echo cancellation at a mobile device, the method comprising: detecting a degradation in a quality of acoustic echo cancellation being performed by an acoustic echo canceller upon audio input received at a microphone of the mobile device; determining that the degradation in the quality of the acoustic echo cancellation coincides with a non-acoustic physical event detected using an auxiliary sensor at the mobile device; and based on the determining, causing the acoustic echo canceller to reconverge.

In another aspect of the present disclosure, there is provided a mobile device comprising a microphone array, an audio beamformer and an auxiliary sensor, the mobile device being operable to: based on audio input received at the microphone array, detect a change in a direction of arrival of the audio input; determine that the detected change in the direction of arrival of the audio input coincides with a non-acoustic physical event detected using the auxiliary sensor; and based on the determining, steer the audio beamformer in the changed direction of arrival of the audio input.

In another aspect of the present disclosure, there is provided a mobile device comprising a microphone, an acoustic echo canceller and an auxiliary sensor, the mobile device being operable to: detect a degradation in a quality of acoustic echo cancellation being performed by the acoustic echo canceller upon audio input received at the microphone; determine that the degradation in the quality of the acoustic echo cancellation coincides with a non-acoustic physical event detected using the auxiliary sensor; based on the determining, cause the acoustic echo canceller to reconverge.

In another aspect of the present disclosure, there is provided a method of performing acoustic echo cancellation at a mobile device, the method comprising: using an acoustic echo canceller, performing acoustic echo cancellation upon audio input received at a microphone of the mobile device; and based at least in part upon on a detected motion of the mobile device, causing the acoustic echo canceller to converge.

In some embodiments, the auxiliary sensor is a motion sensor and wherein the non-acoustic physical event is a motion of the mobile device.

In some embodiments, the auxiliary sensor is a proximity sensor and wherein the non-acoustic physical event is a newly detected proximate object or a detected change in a proximity of an object.

In some embodiments, the auxiliary sensor is a heat sensor and wherein the non-acoustic physical event is a newly detected heat source or a detected change in an amount of heat emitted by a heat source.

In some embodiments, the detecting of the degradation in the quality of acoustic echo cancellation comprises determining that an Echo Return Loss Enhancement (ERLE) measure has dropped below a threshold value.

In a further aspect of the present disclosure, there is provided a method comprising: based on audio input received at a mobile device, detecting a change in an acoustic environment of the mobile device; determining that the detected change in the acoustic environment coincides with a non-acoustic physical event detected using an auxiliary sensor at the mobile device; and based on the determining, recalibrating a signal processor for processing the audio input.

In a further aspect of the present disclosure, there is provided a computer-readable medium storing instructions that, when executed by a processor of a mobile device, cause the mobile device to effect any one of the above methods.

In a further aspect of the present disclosure, there is provided a mobile device comprising an auxiliary sensor and a signal processor, the mobile device operable to: based on audio input received at a mobile device, detect a change in an acoustic environment of the mobile device; determine that the detected change in the acoustic environment coincides with a non-acoustic physical event detected using an auxiliary sensor at the mobile device; and based on the determining, recalibrate a signal processor for processing the audio input.

Figure 2:
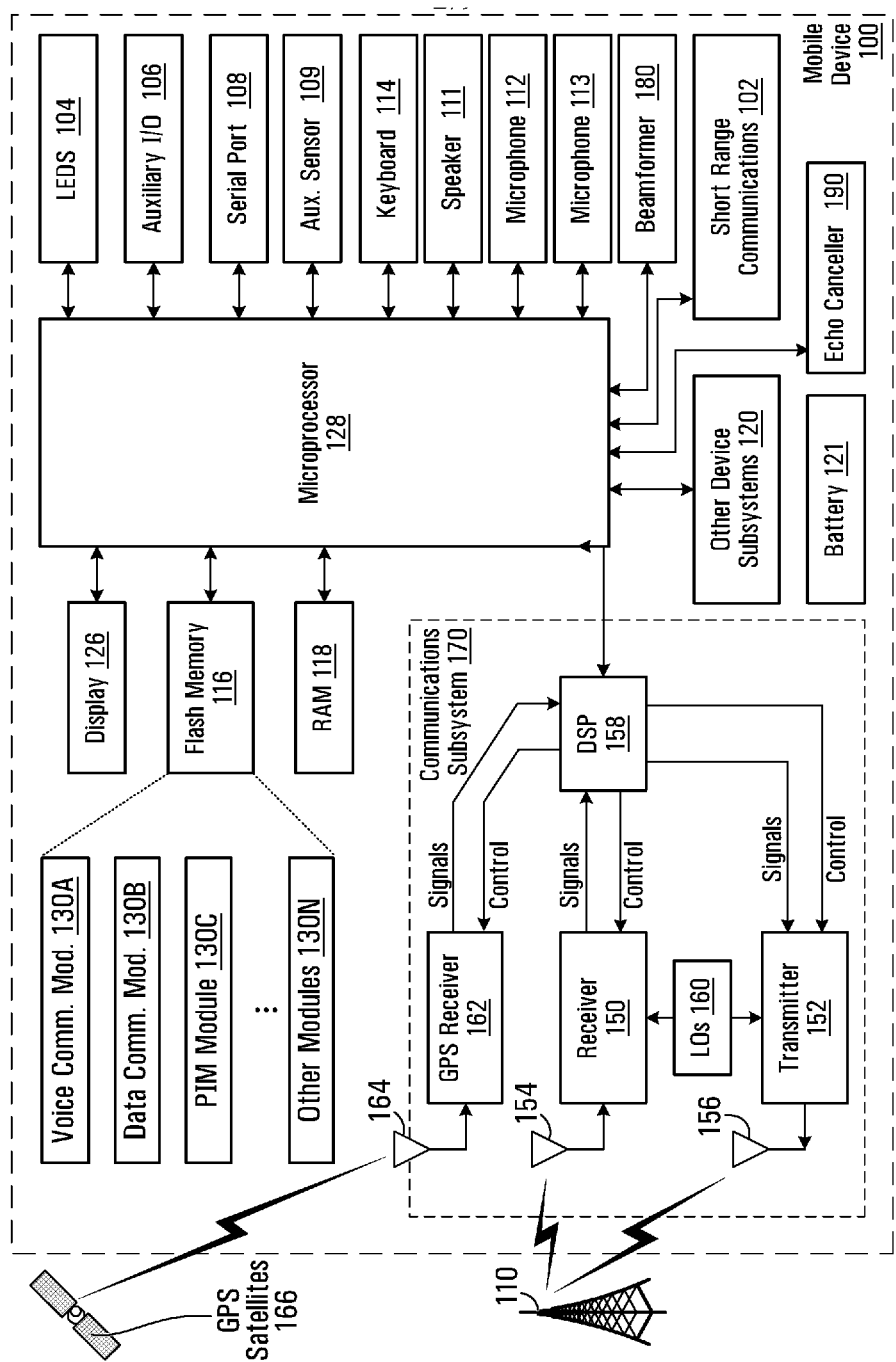
FIG. 2. is a schematic diagram illustrating the mobile device of FIG. 1 in greater detail.

Referring to FIGS. 1 and 2, an exemplary embodiment of a mobile device 100, which may alternatively be referred to as a "handheld device" or simply "device" 100, will be described. In FIG. 1, the device 100 is depicted in an acoustic environment 200. The illustrated device 100 is a smartphone, but another type of mobile device (e.g. a tablet computer, cordless telephone, handheld two-way radio, digital audio recorder, to name a few non-limiting examples) could be used in alternative embodiments. A handheld device is a device sized and shaped to be held or carried in a human hand, and may be used while being so held or carried.

The exemplary device 100 comprises a rectangular housing 101, a speaker 111, a first microphone 112 at the top of the housing 101, a second microphone 113 at the bottom of the housing 101, a keyboard 114 and a display 126. The two microphones 112, 113 may be considered to define a microphone array 115 that is affixed to the mobile device 100. The array can be used in conjunction with an audio beamformer 180 at the device 100, described below. Other components of device 100 have been omitted from FIG. 1 for clarity.

The exemplary acoustic environment 200 in which the device 100 is situated comprises a primary audio source 202, a secondary audio source 204, and a reflecting surface 206. The primary audio source 202 may be a voice of a user of the device 100. The second audio source 204 may be a voice of another person proximate to the device 100 or background noise. In FIG. 1, the direction of arrival (DOA) of sound waves from the primary audio source 202 to the microphone 113 is denoted A1, and the direction of arrival of sound waves from the primary audio source 202 to the microphone 113 is denoted A2. As illustrated, A1 and A2 denote different directions. The reflecting surface 206 may be a wall or other surface of a physical object proximate the device 100 that is capable of reflecting sound waves, such as those associated with audio generated by the speaker 111, back to a microphone 112 or 113 of the mobile device. Exemplary reflection of sound waves from speaker 111 to microphone 113 is shown in FIG. 1. This may be considered to define an acoustic path. Of course, it is understood that the actual acoustic environment of device 100 may change over time, and may be a function of its location.

Referring now to FIG. 2, a schematic diagram of mobile device 100, which may implement any of the methods described herein, is illustrated. It is to be understood that the mobile device 100 is shown with specific details for exemplary purposes only. For example, one or more illustrated components, such as short range communications 102, LEDs 104, auxiliary I/O 106, serial port 108, keyboard 114, applications 130A, 1306, 130C and 130N, other device subsystems 120, display 126 and communications subsystem 170 (which are referenced or described below) may be omitted in some embodiments.

The mobile device 100 has a housing 101 (shown in FIG. 1) that is elongated vertically, but may take on other sizes and shapes, including clamshell housing structures, in other embodiments. The keyboard 114 may include a mode selection key, or other hardware or software for switching between text entry and telephony entry.

A microprocessor 128 is shown schematically as coupled between a keyboard 114 and a display 126. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, an auxiliary sensor 109, a speaker 111, microphones 112 and 113; as well as memory devices including a flash memory 116 and a Random Access Memory (RAM) 118; and various other device subsystems 120. The keyboard 114, speaker 111, microphones 112 and 113, display 126, and LEDs 104 are part of the user-interface.

The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device users corresponding data items stored or associated with a host computer system. The application 30 may also be stored in flash memory 26, possibly along with other applications (not expressly shown).

Additional software modules, illustrated as another software module 130N, may be installed during manufacture. The software modules may, for example, include one or more modules that control the execution of the methods described herein.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks, UMTS network, LTE network and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS or UMTS or EPC networks, however, network access is typically associated with a subscriber or user of a device. A GPRS/UMTS/LTE device therefore typically has a subscriber identity module (often referred to as a SIM card) or a User Services Identity Module (USIM), in order to operate on a GPRS or UMTS or EPC network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110, as user-initiated user-plane data via the communication subsystem 170.

In a voice communication mode, overall operation of the device is substantially similar to the data communication mode, except that received signals are output to a speaker 111, and signals for transmission are generated by a microphone 112 and/or microphone 113. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In the illustrated embodiment, the auxiliary sensor 109 is a motion sensor capable of detecting motion of the mobile device. In the present disclosure, "motion" of the mobile device refers to any one or more of: a change in orientation of the mobile device (e.g. pitch, roll or yaw), tilting of the device, translational motion of the mobile device, or other types of device motion. The motion sensor may be an accelerometer. As is known in the art, an accelerometer senses and converts an acceleration detected from a motion (e.g. tilt, inertial, or vibration) or gravity into an electrical signal, producing a corresponding change in output. A single-axis or multi-axis accelerometer may be used, dependent upon cost and precision requirements. The accelerometer may for example be a capacitive, piezoelectric, piezoresistive, or a gas-based accelerometer. In some embodiments, the accelerometer may be a digital micro-electromechanical system (MEMS) accelerometer. As will be described below, the auxiliary sensor 109 in other embodiments may be another type of motion sensor or a different type of sensor altogether.

The mobile device 100 also comprises an audio beamformer (or simply "beamformer") 180. The beamformer 180 is a component or module that provides for directional audio input reception by the microphone array 115. The beamformer 180 may be an adaptive noise-cancelling beamformer. In the present embodiment, the beamformer 180 is primarily implemented in software that executes either on the microprocessor 128 or on a separate digital signal processor (not expressly illustrated). An example beamformer 180 may comprise two finite impulse response (FIR) filters, each for filtering digitized audio input received at a respective one of the microphones 112 and 113, and a summing stage. Coefficients or "tap weights" associated with each filter can be adjusted to effectively steer the beamformer to listen in a desired direction (e.g. towards primary audio source 202 of FIG. 1) while ignoring noise from other directions (e.g. secondary audio source 204 of FIG. 1). The FIR filter coefficients can be considered to constitute a model of the acoustic environment 200 in that they are representative of, or based on, a direction or angle of arrival of an audio input of interest relative to the microphone array.

The mobile device 100 further comprises an acoustic echo canceller (or simply "echo canceller") 190. Echo canceller 190 is a component or module that is responsible for removing acoustic echo, such as the reflection of sound waves by reflecting surface 206 for example, from the audio input that has been received at microphone 112. Like beamformer 180, the echo canceller 190 of the present embodiment is a primarily software component, with the software executing either on the microprocessor 128 or on a separate digital signal processor (not expressly illustrated). The echo canceller 190 may similarly comprise two FIR filters, each for filtering digitized audio input received at a respective one of the microphones 112 and 113. In one embodiment, the echo canceller 190 may be cascaded with the beamformer 180. For example, each FIR filter in the echo canceller 190 may be fed into a respective one of the FIR filters of the beamformer 180, where they are summed by a summing stage. Coefficients associated with each filter of the echo canceller 190 can be adjusted to match an echo path or acoustic path of sound in the acoustic environment 200 of device 100, to facilitate distinguishing and subtraction of acoustic echo from other audio input. The FIR filter coefficients of the echo canceller 190 can thus be considered to constitute a model of the acoustic path in the acoustic environment 200 of device 100 that is indicative of the location of the reflecting surface 206 (FIG. 1).

Figure 3:
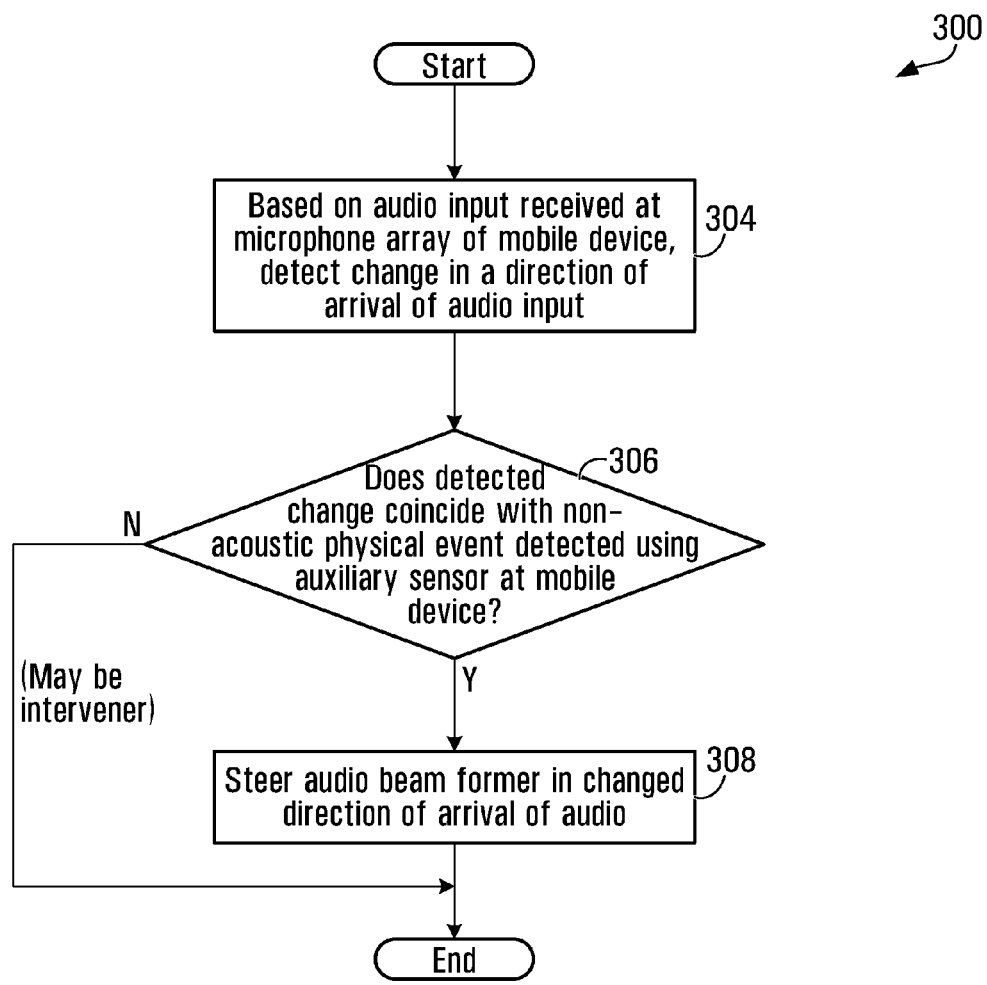
FIG. 3 is a flowchart illustrating operation of a mobile device comprising a beamformer.
Figure 4A:
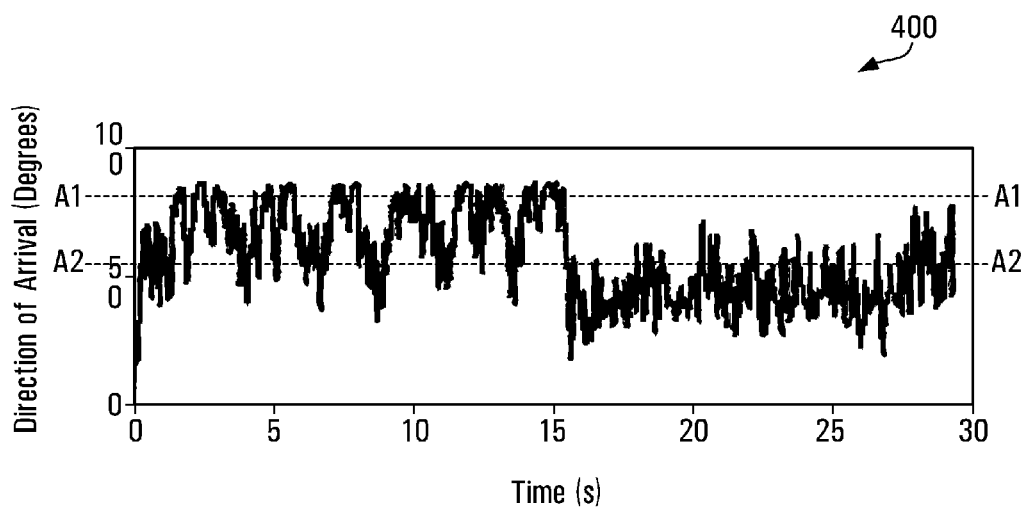
FIG. 4A is a graph showing an estimated direction of arrival of audio from an audio source to a microphone array at a mobile device versus time.
Figure 4B:
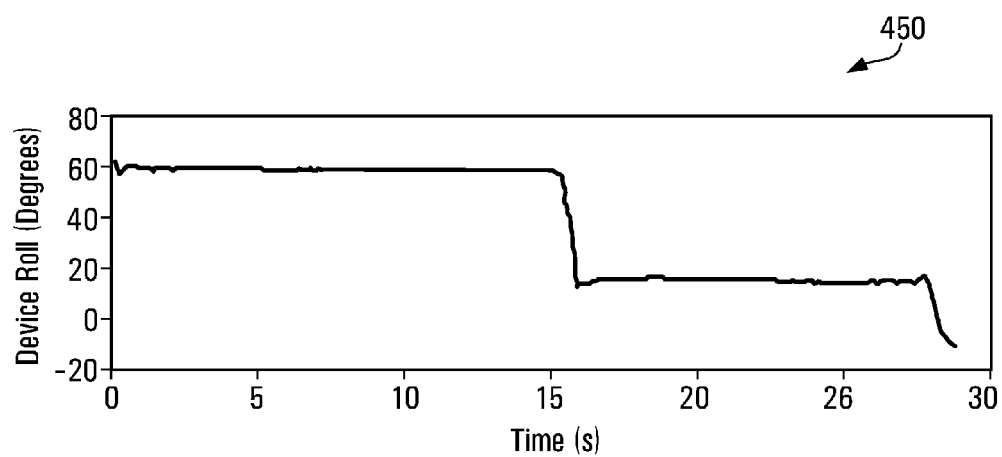
FIG. 4B is a graph, aligned in time with the graph of FIG. 4A, showing motion of the mobile device versus time.

Exemplary operation 300 of a mobile device comprising a beamformer is illustrated in FIG. 3 in conjunction with FIGS. 4A and 4B. Although operation 300 is described below with reference to device 100 of FIGS. 1 and 2, it will be appreciated that operation 300 may also describe the operation of alternative embodiment devices, such as device 700 of FIG. 7 (as described hereinafter). In other words, operation 300 is not necessarily tied to any particular embodiment of mobile device.

Referring to FIG. 3, it is presumed that the beamformer, such as beamformer 180 of device 100, has been caused to converge before operation 300 commences. Convergence may be achieved by setting the coefficients of the beamformer FIR filters so that the gain in the direction of a desired audio source is maximized while the gain in the direction of any undesired audio source(s) is (are) minimized, e.g. using delay-and-sum or other approaches that are known in the art. In the present example, it is presumed that this convergence steers the beamformer 180 in the A1 direction of arrival of audio from the primary audio source 202 (see FIG. 1), which may be the voice of the device user. The primary audio source 202 may be considered as the dominant audio source, e.g. due to the relative quietness or possibly silence of the secondary audio source 204 at the time of convergence. Thus at the conclusion of convergence, the FIR filters of beamformer 180 will reflect the fact that beamformer 180 is steered in the A1 direction. Beamformer convergence (or reconvergence) is considered to constitute a form of signal processor calibration (or recalibration).

Referring to FIG. 4A, a graph 400 showing a direction of arrival (estimated) of the dominant audio source relative to the microphone array 115 of device 100 over time is illustrated. The direction of arrival may be extracted from a time delay of arrival (TDOA), which may be computed by cross-correlation of the audio inputs from the microphones 112, 113. The FIR filter coefficients of beamformer 180 may be determined based on the estimated direction of arrival, and in that sense contain information about the direction of arrival.

As illustrated in the graph 400, from time t=0 seconds to time t=16 seconds, audio input from the dominant audio source arrives substantially from the A1 direction, with some degree of fluctuation over that time. The fluctuation may be a result of intermittent pauses in the audio input received at the microphone array 115. In particular, during active audio input (e.g. active speech), the estimated DOA may be near its true value (A1), whereas during pauses in the audio input (e.g. speech pauses), the estimated DOA may drop to 0. Low-pass filtering the DOA estimate may be used to reduce the fluctuations from the range [0,A1] to the range [A2,A1]. In some implementations, the device 100 may suspend estimating a direction of arrival during pauses in the audio input, e.g. to conserve processor or battery resources. Even in that case, fluctuations in the estimated DOA may still exist, possibly being caused by measurement noise and uncertainty, minor device movement, or a combination of these.

At time t=16 seconds, however, based on further audio input received at the microphone array 115, an abrupt change in the direction of arrival of the dominant audio source is detected (304, FIG. 3). In particular, the direction of arrival changes at t=16 seconds from substantially the A1 direction to substantially the A2 direction, where it remains from t=16 to time t=30, again with some degree of fluctuation over time.

It will be appreciated that the change in direction of arrival of the dominant audio source, from direction A1 to direction A2, is potentially attributable to (at least) two different scenarios.

In a first possible scenario, a new audio source, such as secondary audio source 204 (FIG. 1), may intervene in acoustic environment 200 and become the new dominant audio source. In this scenario, the intervening audio source may be an undesired audio source, such as an unexpected background noise or another person, proximate to the device 100, suddenly speaking loudly. In this case, it may be desired to attenuate or cancel the newly detected audio input arriving from the A2 direction while maintaining the steering of the beamformer 180 in the A1 direction, to ensure continued enhancement of audio input of the voice of the device user and cancellation of undesired noise.

In a second possible scenario, the mobile device 100 may move in such a way that the direction of arrival of audio input from the dominant audio source, i.e. primary audio source 202, changes from the A1 direction to the A2 direction. This may for example result when a user of mobile device 100, who is carrying the device 100, changes the orientation of the device 100 relative to the primary audio source 202 or translates the device 100 in space in relation to the primary audio source 202. For instance, when the primary audio source 202 is the voice of the user of mobile device 100, the simple act of repositioning the device 100 relative to the face of the user could have the effect of changing the direction of arrival of the user's voice at the microphone array 115 from the direction A1 to direction A2. In this case, it may be desired to steer beamformer 180 in the A2 direction, in order to continue to enhance the voice of the device user while attenuating or cancelling noise from other directions.

Because the cause of the detected change in the acoustic environment of mobile device 100 is unclear from the audio input alone, the desired course of action in response to the detected change is uncertain from the audio input alone. Processing of further audio input received at the microphone array 115 over time may help to reduce this uncertainty. For example, if simultaneous audio input from both directions A1 and A2 is detected, is may be concluded that the first scenario is the more likely of the two. However, this processing of further audio input may take time, during which the beamformer may be steered in a sub-optimal direction, possibly resulting in undesirable attenuation of the device user's voice or enhancement of noise. The lag between the detected change and any reconvergence of the beamformer 180 that may ultimately be deemed necessary may be considered undesirable.

Referring again to FIG. 3, in order to facilitate timely disambiguation of which of the two scenarios is indicated, a determination is made (in operation 306) regarding whether the detected change in the direction of arrival of the audio input coincides with a non-acoustic physical event detected using an auxiliary sensor at the mobile device. In this example, the auxiliary sensor 109 of device 100 is a motion sensor, which is capable of detecting motion of the mobile device 100. Motion of the device 100 is one example of a "non-acoustic physical event" that an auxiliary device may be capable of detecting. Other non-limiting examples are provided below. In the present example, the determination in operation 306 determines whether the detected change in the direction of arrival of the audio input coincides with a detected motion of the mobile device.

For clarity, the term "coincides" as used herein means "occurs at or near the same time as, with an acceptable degree of tolerance." In some embodiments, the tolerance may be based on the DOA measurement or estimation interval, which may be every 20 milliseconds for example. In that case, when the detected change is within that interval (e.g. plus or minus 20 milliseconds) of the time of detected motion, the events may be considered to coincide. In some embodiments, the tolerance may be based upon an interval (e.g. average interval, most recent interval, etc.) between active speech events detected at the microphone array 115. The latter approach may increase the likelihood of detecting the second scenario even in the event that the motion of the mobile device happens to occur while no audio input is being detected, e.g. between active audio input events (such as between user utterances). In that case, the tolerance may be set to the greater of the DOA measurement interval and the time since the last active speech event. In any case, a signal from the auxiliary sensor 109 (which again is a motion sensor such as an accelerometer in this embodiment) is examined to ascertain whether any motion of the mobile device 100 (or, in some embodiments, whether significant motion of the mobile device 100) was detected at or near (within any operative tolerance period) the time of the detected change in the direction of arrival of the audio input, i.e. t=16 seconds.

Referring to FIG. 4B, which is a graph 450 showing motion of the mobile device (in particular, roll) in degrees versus time, as indicated by the output of the motion sensor 109, a significant change in the orientation of the device 100, from approximately 60 degrees to approximately 20 degrees, at or near time t=16 seconds, is shown. As such, the determination of operation 306 (FIG. 3) is made in the affirmative, thereby facilitating timely disambiguation of the above two scenarios. In particular, the affirmative determination tends to indicate the second scenario.

Based on the affirmative determination in operation 306 (FIG. 3), the audio beamformer 180 is steered in the changed direction of arrival of the audio input (308, FIG. 3). In some embodiments, this may be accomplished by resetting the coefficients of the FIR filters of beamformer 180 to a predetermined initial value and allowing the beamformer 180 to reconverge, i.e. to cause beamformer convergence to occur once again, to the currently dominant audio input. The initial value for the coefficients of a length-N beamformer (i.e. a beamformer employing FIR filters of length N) may be 1 followed by N−1 zeros, a setting that may cause the beamformer to pass through the microphone signal unchanged. When reconvergence is complete, the beamformer 180 will be steered (or "re-steered") in the changed direction of arrival of the audio input, i.e. from direction A1 to direction A2. Operation 300 thus terminates.

In some embodiments, the change in direction indicated by the beamformer FIR filter coefficients after reconvergence to the currently dominant audio input may be compared to the detected change in orientation as determined from the motion sensor signal. If the two are consistent (e.g. substantially equal to one another), then the former may serve to corroborate the latter. If the two are inconsistent (e.g. differ substantially from one another), it may be decided to repeat beamformer reconvergence, e.g. to avoid inadvertent reconvergence upon an undesired or unintended audio source (such as a transient background noise).

If the determination of 306, FIG. 3, had been made in the negative, e.g. if no significant device motion were detected, operation 300 would have terminated without any resteering of the beamformer 180. That is, the beamformer 180 would remain steered in the A1 direction (no reconvergence would be initiated), e.g. because the change in the direction of arrival of the dominant audio source of FIG. 4A may be considered to be a "false positive" (such as a transient background noise).

In some embodiments, the order of operations 304 and 306 may effectively be reversed in the sense that, initially, a motion of the device 100 may be detected and, thereafter, a determination can be made regarding whether the detected motion coincides with a detected change in the direction of arrival of the audio input.

Figure 5:
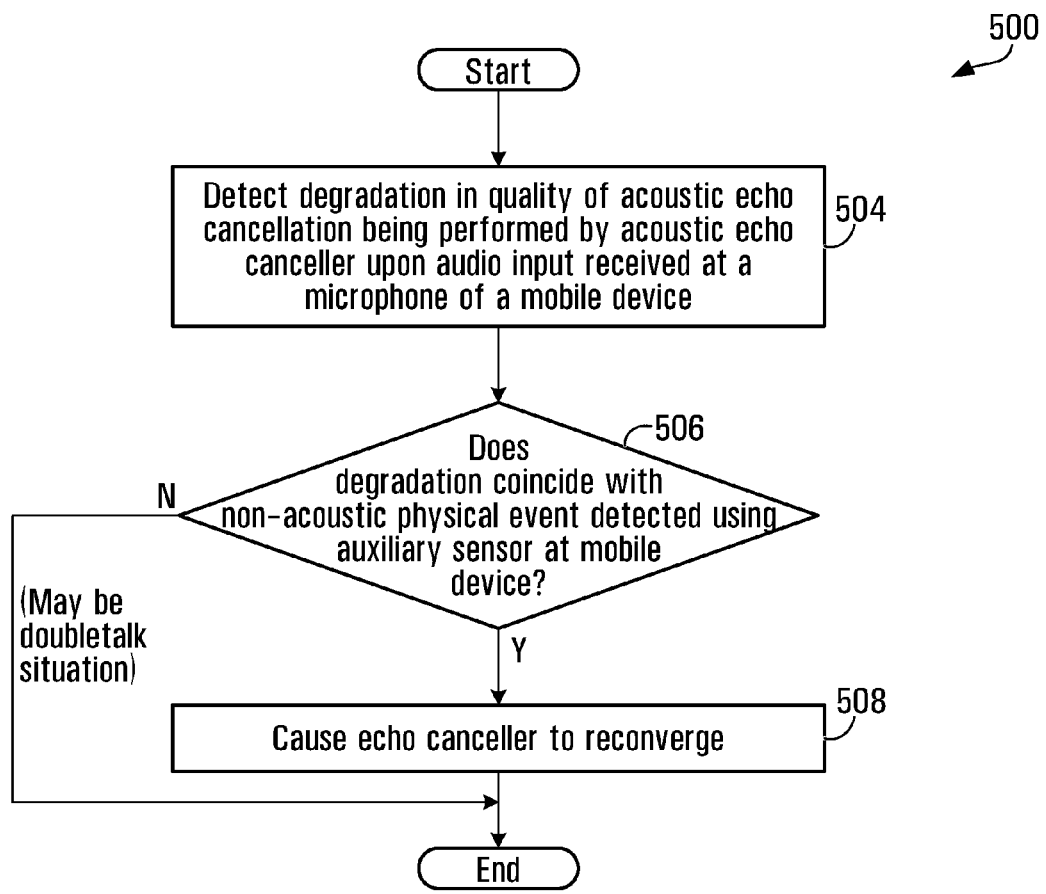
FIG. 5 is a flowchart illustrating operation of a mobile device comprising an echo canceller.
Figure 6A:
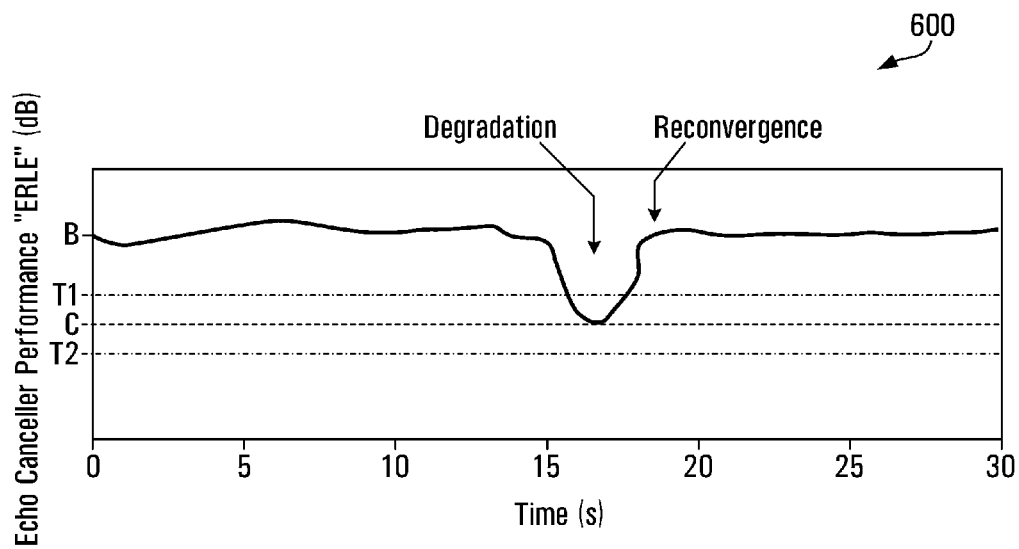
FIG. 6A is a graph of a performance measure of an echo canceller at the mobile device versus time.
Figure 6B:
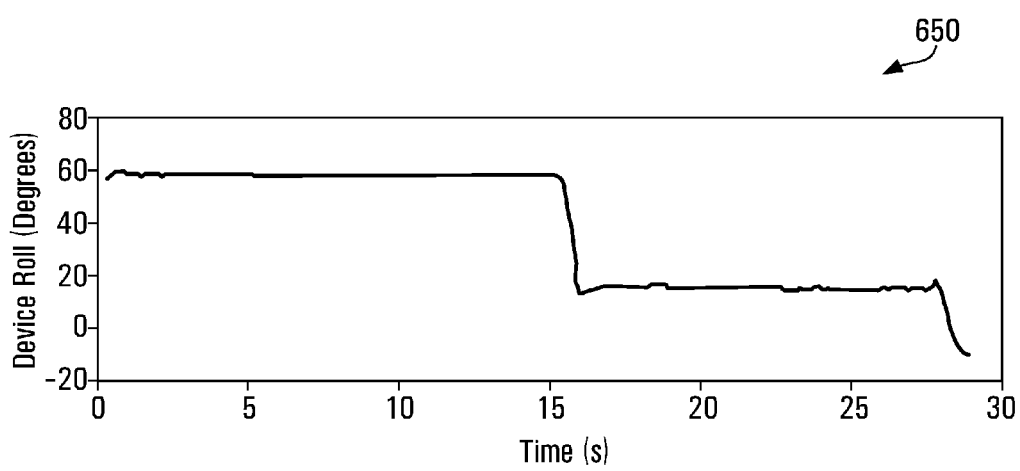
FIG. 6B is a graph, aligned in time with the graph of FIG. 6A, showing motion of the mobile device versus time.

Exemplary operation 500 of a mobile device comprising an echo canceller is illustrated in FIG. 5 in conjunction with FIGS. 6A and 6B. Although operation 500 is described below with reference to device 100 of FIGS. 1 and 2, it will be appreciated that operation 500 may also refer to the operation of alternative embodiment devices, such as device 800 of FIG. 8 (as described hereinafter). In other words, operation 500 is not necessarily tied to any particular embodiment of mobile device.

Turning to FIG. 5, it is presumed that the echo canceller, such as echo canceller 190 of device 100, has been caused to converge before operation 500 commences. Convergence may be achieved by setting the coefficients of the echo canceller FIR filters to match the echo path or acoustic path defined by reflective surface 206 (FIG. 1). Convergence causes the echo canceller 190 to become configured for cancelling the acoustic echo from one or more reflective surfaces, such as reflective surface 206 of FIG. 1. Echo canceller convergence (or reconvergence) is considered to constitute a form of signal processor calibration (or recalibration). It should be recognized that the use of a microphone array 115 may be unnecessary for the purpose of echo canceller convergence, i.e. the echo canceller 190 may be capable of detecting echo and cancelling it even using the input from only a single microphone 112 or 113. Thus, the described operation could be used in even in device embodiments having only a single microphone. In a single microphone device, the echo canceller may have a single FIR filter, as it is common (although not necessarily required) for the number of FIR filters to be the same as the number of channels.

Referring to FIG. 6A, a graph 600 showing a performance of echo canceller 190 over time is illustrated. Echo canceller performance may be measured using a calculation known as Echo Return Loss Enhancement (ERLE) for example. The ERLE is a ratio of the power of the input echo to the uncancelled echo. The ERLE measure may be considered to indicate a quality of acoustic echo cancellation and is typically expressed in decibels (dB), e.g.:

$$\text{ERLE (dB)} = 10 * \log 10((\text{input echo power})/(\text{residual echo power}))$$

Because echo canceller 190 had earlier converged as described above, the performance of echo canceller 190, as indicated by the ERLE, is initially at B decibels. That level of performance is above a minimum threshold level of performance (i.e. minimum acceptable echo cancellation quality) of T1 decibels, below which reconvergence of the echo canceller 190 is advisable for improving echo canceller performance.

As illustrated in the graph 600, the quality of echo cancellation between time t=0 seconds and time t=16 seconds remains at approximately B decibels, which is an acceptable level (i.e. is above threshold T1). At a time of about t=16 seconds, however, a degradation in echo canceller performance, i.e. a degradation in the quality of acoustic echo cancellation being performed by the echo canceller 190 upon audio input received at a microphone 112 or 113, is detected (504, FIG. 5). In particular, the quality of echo cancellation (here, ERLE) drops to C, which is below currently operative threshold T1.

It will be appreciated that the degradation in the quality of acoustic echo cancellation from B to C is potentially attributable to two different scenarios.

In a first possible scenario, which is referred to as the "doubletalk case," new audio input from an audio source, which may either be primary audio source 202 or secondary audio source 204 (FIG. 1), may be mistaken for a strong uncancelled echo. This may for example occur when the user of device 100 or a proximate person begins speaking while a remote talker is also speaking. In this scenario, it is typically undesirable to cause the echo canceller 190 to reconverge, because the ostensible uncancelled echo is actually transient doubletalk that will usually resolve itself in short order. Reconvergence in this case could also have the undesired effect of reintroducing acoustic echo associated with the reflective surface 206 back into the audio that is transmitted to the remote talker. Reconvergence in this case could also have the undesired effect of degrading transmitted speech.

In a second possible scenario, the mobile device 100 may have moved in such a way that the acoustic path between the speaker 111 and the microphone 112 has changed. This may for example result when a user of mobile device 100, who is carrying the device 100, moves the device 100 closer to or away from reflective surface 206 or changes the orientation of the device 100 relative to the reflective surface 206. It may also result when movement of the device 100 has resulted in a new reflective surface being introduced into the acoustic environment 200, in addition to or in place of reflective surface 206. In this case, it may be desired reconverge the echo canceller 190, in order to cause any new acoustic echo(es) to be cancelled.

Yet because the cause of the degradation in quality of acoustic echo cancellation from B to C is unclear from the audio input alone, the desired course of action in response to the degradation is uncertain from the audio input alone. Further processing of further audio input over time could help to reduce this uncertainty. For example, a cross-correlation based doubletalk detectors, as described in: Benesty, J.; Morgan, D. R.; Cho, J. H.; "A new class of doubletalk detectors based on cross-correlation," Speech and Audio Processing, IEEE Transactions on, vol. 8, no. 2, pp. 168-172, March 2000, which is hereby incorporated by reference, could be used.

However, such further processing of further audio input may take time, during which the echo cancellation performance may be poor. Moreover, the lag between the degraded acoustic echo cancellation quality and any reconvergence of the echo canceller 190 that may ultimately be deemed necessary may be considered undesirable.

To facilitate disambiguation between the two scenarios, a determination is made (in operation 506, FIG. 5) regarding whether the degradation in the quality of the acoustic echo cancellation coincides with a non-acoustic physical event detected using an auxiliary sensor at the mobile device. As earlier noted, the auxiliary sensor 109 of device 100 is a motion sensor which is capable of detecting motion of the mobile device 100. Motion of the device 100 is one example of a "non-acoustic physical event" that an auxiliary device may be capable of detecting. Other non-limiting examples are provided below. In the present example, the determination in operation 506 determines whether the detected degradation in the quality of the acoustic echo cancellation coincides with a detected motion of the mobile device. In particular, a signal from the motion sensor 109 may be examined to ascertain whether any motion of the mobile device 100 (or, in some embodiments, whether significant motion of the mobile device 100) was detected at or near the time that in the quality of echo cancellation fell below an operative minimum threshold T1, i.e. t=16 seconds.

Referring to FIG. 6B, which is a graph 650 showing motion of the mobile device (in particular, roll) in degrees versus time, as may be indicated by the output of the motion sensor 109, it can be determined that the orientation of the device 100 did in fact change from approximately 60 degrees to approximately 20 degree at or near time t=16 seconds. As such, the determination of 506, FIG. 5 is made in the affirmative, thereby facilitating disambiguation of the above two scenarios. In particular, the affirmative determination in operation 506 tends to indicate the second scenario.

It should be appreciated that, in some embodiments, the echo cancellation quality threshold that determines when echo canceller 190 is to reconverge may be dynamically adjustable based on the current degree of motion of the mobile device 100. For example, a flag or other indicator may be set when device motion (e.g. significant device motion, e.g. greater than predefined threshold of translation, orientation change, etc.) is observed. This may cause the echo canceller 190 to change a threshold degradation level that is required for reconvergence, e.g. from a default level of T2 to a level T1 representative of a lesser degree of degradation (see FIG. 6A). The changed threshold may speed echo canceller reconvergence by reducing the amount of echo cancellation quality degradation required for reconvergence during periods of notable or significant motion of the mobile device 100 in relation to periods of lesser device motion. This may in turn reduce the associated echo canceller 190 performance impact at the device 100 (e.g. it may reduce the duration of degraded echo cancellation), e.g. in relation to an embodiment in which the echo canceller threshold is fixed at T2. Once the device movement ceases, the threshold may be readjusted back from T1 to T2. Example values of parameters B, C, T1 and T2 may be as follows: B=15 dB, C=6 dB, T1=C+3 dB, T2=C−3 dB. These values are understood to be non-limiting examples.

In some embodiments, reconvergence speed may be made proportional to the degree of motion detected. For example, multiple thresholds between T1 and T2 may be set, with the currently operative threshold being determined by the currently detected degree of motion of the device. In response to greater or more significant motion, a higher echo cancellation quality threshold may be effected (e.g. the threshold may shift towards T1). Conversely, in response to no motion or less significant motion, a lower echo cancellation quality threshold may be effected (e.g. the threshold may shift towards T2). If echo cancellation quality drops below the currently operative threshold, reconvergence may be triggered. Thus, a dynamically changing echo cancellation quality threshold may be employed.

In the present embodiment, based on the affirmative determination of operation 506 (FIG. 5), the echo canceller 190 is caused to reconverge (508, FIG. 5). In the result, the echo canceller 190 adapts to, and eliminates, any changed or new acoustic echoes in the acoustic environment 206. In some embodiments, reconvergence may be accomplished by resetting the coefficients of the FIR filters of echo canceller 190 to a predetermined initial value (e.g. zero) and allowing the echo canceller 190 to repeat its initial convergence, now in relation to whatever new or changed reflecting surface(s) may now exist in the acoustic environment 200. Operation 500 thus terminates.

If the determination of operation 506 had been made in the negative, operation 500 would have terminated without any reconvergence of the echo canceller 190.

The above description describes exemplary embodiments in which the auxiliary sensor is a motion sensor, and in particular, an accelerometer. It will be appreciated that, it alternative embodiments, other forms of motion sensors, such as magnetometers, gyroscopes, or other types of orientation or inertial sensors, may be used.

It will further be appreciated that, it some embodiments, the auxiliary sensor 109 may not be a motion sensor at all but may instead be a different type of sensor. The auxiliary sensor will generally be other than (different from) an audio input transducer, precisely because audio input alone may result in ambiguity regarding the likely reason for an acoustic environment change, as discussed above. The auxiliary sensor may be capable of detecting non-acoustic physical events in a physical environment of the mobile device 100 that facilitate disambiguation of a change in the acoustic environment of the mobile device 100. Non-limiting examples of alternative auxiliary sensors, beyond motion sensors, include proximity sensors (e.g. for detecting proximate audio reflecting surfaces), heat sensors (e.g. for detecting proximate heat-emitting audio reflecting surfaces such as a face of a user), touch sensors, or other types of sensors. Because the auxiliary sensor in such embodiments (as well as in motion sensor embodiments) is other than an audio input transducer, and because the physical events that will be detected are accordingly not acoustic events (e.g. are not audio input as such or detected changes in audio input as such), the detected events are referred to as non-acoustic physical events. Non-limiting examples of non-acoustic physical events that the auxiliary sensors may be capable of detecting (beyond device motion) include a newly detected proximate object, a change in a proximity of an object, a detection of a heat source, or a change in an amount of heat emitted by a heat source. Auxiliary sensors may generally provide information indicating or suggesting a probable cause of the change in the acoustic environment. The auxiliary sensor information can thus help to disambiguate between two events which may have produced the change in the acoustic environment, one event warranting signal processor recalibration and the other not necessarily warranting any signal processor recalibration.

In some embodiments, the order of operations 504 and 506 may effectively be reversed in the sense that, initially, a non-acoustic physical event may be detected and, thereafter, a determination can be made regarding whether the detected event coincides with a detected degradation in echo canceller performance.

Figure 7:
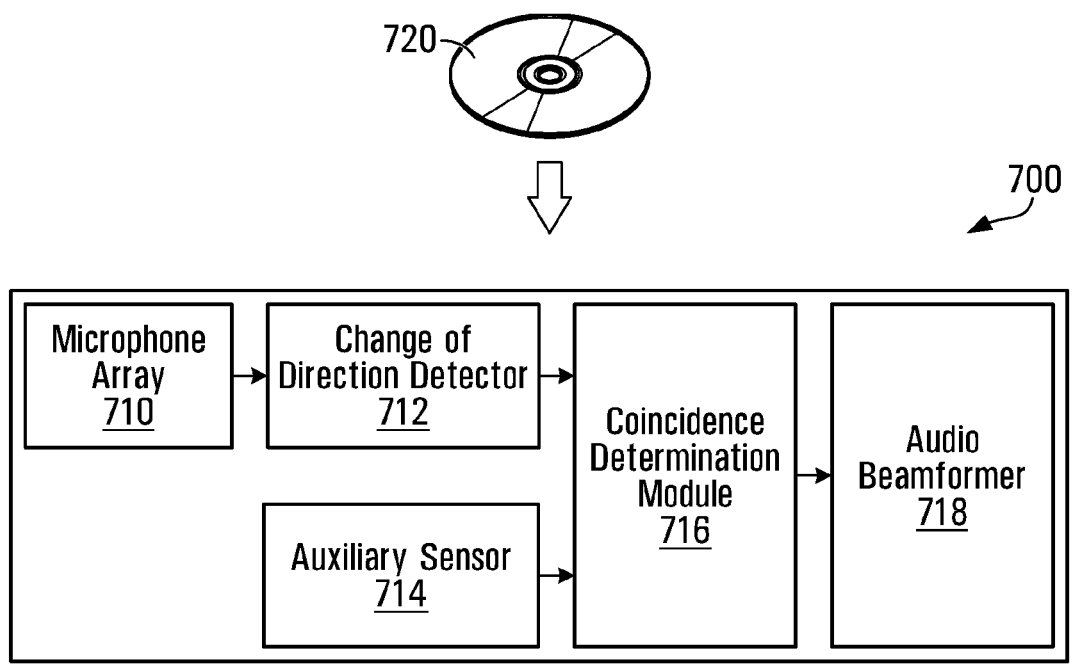
FIG. 7 is an alternative embodiment of a mobile device comprising a beamformer.

FIG. 7 illustrates an alternative embodiment of mobile device 700 comprising an audio beamformer. The mobile device 700 may example be a smartphone, a tablet computer, a cordless telephone, a handheld two-way radio, a digital audio recorder, or other electronic device. The device 700 does not necessarily have wireless communication capabilities. The device 700 comprises a microphone array 710 comprising two or more audio input transducers, a change of direction detector 712 receiving output from the microphone array 710, an auxiliary sensor 714 which may be a motion detector or other type of sensor other than an audio input transducer, a coincidence determination module 716 receiving output from the change of direction detector 712 and auxiliary sensor 714, and an audio beamformer 718 receiving an output from the coincidence determination module 716. The device 700 may have other components, such as a processor and memory, which are not expressly illustrated in FIG. 7 for the sake of brevity.

Operation of device 700 may be described with reference to FIG. 3. At block 304 (FIG. 3), based on audio input received at microphone array 710, change of direction detector 712 (FIG. 7) detects a change in a direction of arrival of the audio input. At block 306 (FIG. 3), coincidence determination module 716 (FIG. 7) determines that the detected change in the direction of arrival of the audio input coincides with a detected non-acoustic physical event detected using the auxiliary sensor 714 of the mobile device 700. At block 308 (FIG. 3), based on the affirmative determination in block 306, the audio beamformer 718 is steered in the changed direction of arrival of the audio input.

Figure 8:
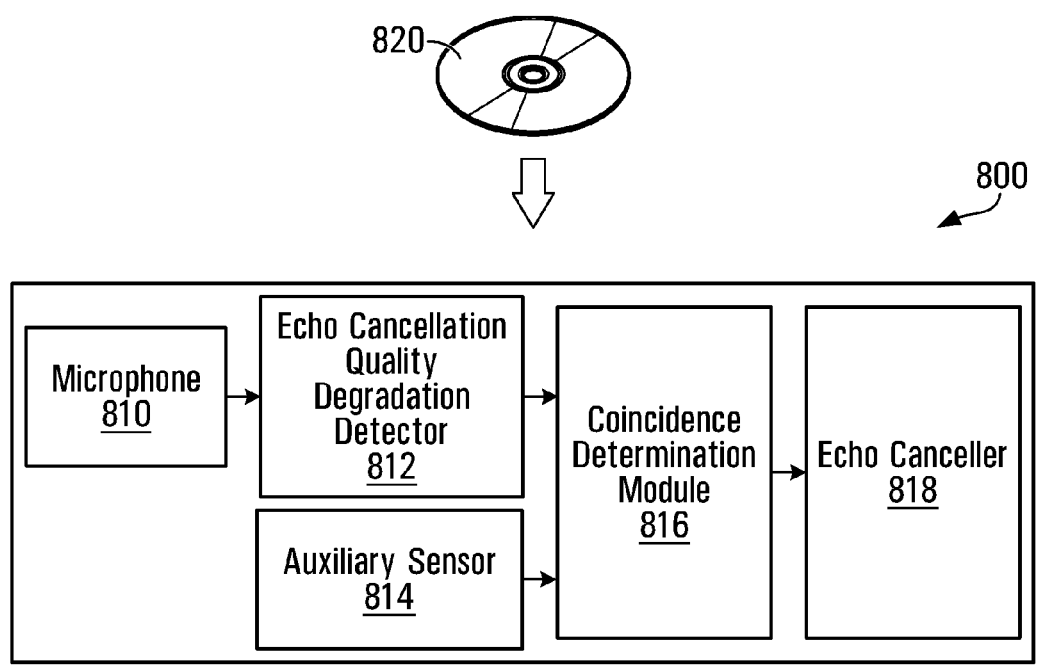
FIG. 8 is an alternative embodiment of a mobile device comprising an echo canceller.

FIG. 8 illustrates an alternative embodiment of mobile device 800 comprising an echo canceller. The mobile device 800 may example be a smartphone, a tablet computer, a cordless telephone, a handheld two-way radio, a digital audio recorder, or other electronic device. The device 800 does not necessarily have wireless communication capabilities. The device 800 comprises a microphone 810 comprising any form of audio input transducer, an echo cancellation degradation detector 812 receiving output from the microphone 810, an auxiliary sensor 814 that may be a motion sensor or other type of sensor other than an audio input transducer, a coincidence determination module 816 receiving output from the echo cancellation degradation detector 812 and auxiliary sensor 814, and an echo canceller 818 receiving an output from the coincidence determination module 816. The device 800 may have other components, such as a processor and memory, which are not expressly illustrated in FIG. 8 for the sake of brevity.

Operation of device 800 may be described with reference to FIG. 5. At block 504 (FIG. 5), echo cancellation degradation detector 812 (FIG. 8) detects a degradation in a quality of acoustic echo cancellation that is being performed by the acoustic echo canceller 818 upon audio input received at microphone 810 of the device 800. At block 506 (FIG. 5), coincidence determination module 816 (FIG. 8) determines that the detected degradation in quality of acoustic echo cancellation coincides with a non-acoustic physical event detected using the auxiliary sensor 814 of the mobile device 800. At block 508 (FIG. 5), based on the affirmative determination in block 506, the echo canceller 818 is caused to reconverge.

Figure 9:
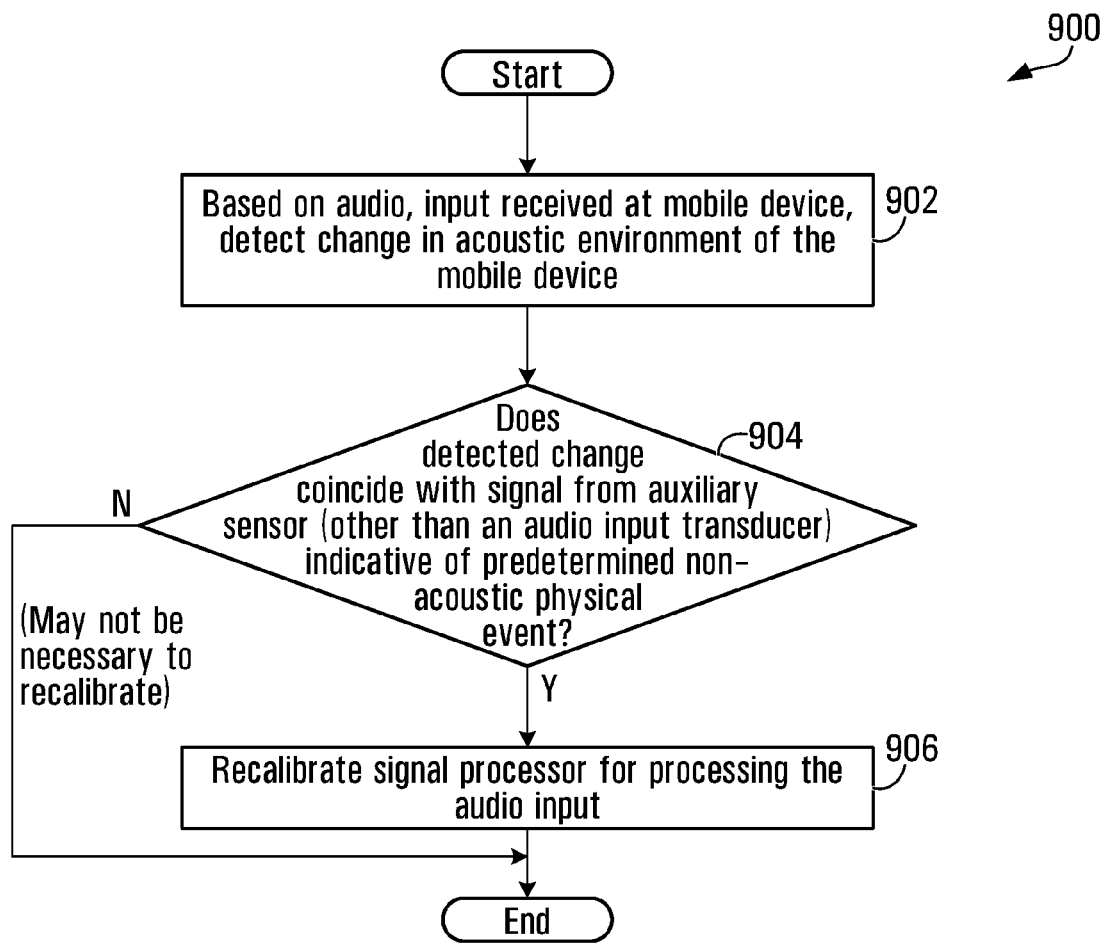
FIG. 9 is a flowchart illustrating operation of a mobile device comprising a signal processor.

Referring to FIG. 9, another flowchart illustrated operation 900 of a mobile device comprising an audio signal processor. It will be appreciated that the illustrated operation 900 is not necessarily specific to mobile device 100, 700 or 900, or any particular device, nor is it necessarily specific to an audio beamformer 180, 718 or echo canceller 180, 918. Rather, operation 900 is generic to signal processors that may comprise such components or other types of components for applying signal processing to received audio input at a mobile device. The operation 900 is also not specific to any particular type of auxiliary sensor 109, 714, 914.

Initially, based on audio input received at the mobile device, e.g. at a microphone or microphone array, a change in an acoustic environment may be detected (902, FIG. 9). For example, the change may be a change in the direction of arrival of an audio source, as detected by a beamformer (e.g. see above). In another example, the change may be a degradation in echo canceller performance, as detected by an echo canceller (e.g. see above). Other types of acoustic environment changes may occur in different embodiments. Some of these are discussed below. Whatever the change in the acoustic environment, the change may be attributable to at least two different scenarios, such as an intervening audio source or a motion of the mobile device.

Because the cause of the detected change in the acoustic environment of mobile device is unclear from the audio input alone, the desired course of action in response to the detected change is uncertain from the audio input alone. Thus, in order to facilitate determination of whether any recalibration of the relevant signal processor for processing the audio input (e.g. reconvergence of a beamformer or an echo canceller) is required or advisable, a determination is made (at 904, FIG. 9) as to whether the detected change in the acoustic environment coincides with a signal from an auxiliary sensor at the mobile device, the auxiliary sensor being other than an audio input transducer, the signal being indicative of a non-acoustic physical event.

For example, when the auxiliary sensor is a proximity sensor, the non-acoustic physical event that is detected may be a new proximate object or a change in a proximity of an object. In that case, the determination of whether signal processor recalibration is required may depend upon the nature of the signal processor in question and the nature of the detected event. For example, if the signal processor is part of a beamformer 180, then signal processor recalibration (e.g. beamformer reconvergence) is not necessarily warranted for a new proximate object, because detection of the new proximate object does not necessarily indicate whether that object should be treated as the dominant audio source (towards which the beamformer should be steered). Conversely, if the proximity sensor has detected a change in proximity of an object, and it is suspected that the object is the face of the device user, then recalibration of the signal processor (re-steering of the beamformer) may in fact be warranted, because the direction of arrival of the device user's voice may have changed (operation 904, FIG. 9).

Alternatively, if the signal processor is part of a echo canceller, then signal processor recalibration (e.g. echo canceller reconvergence) may in fact be warranted for either a newly proximate object or change in proximity of an object, because each of those circumstances may change the reflecting surfaces in the acoustic environment of the mobile device and may thus have caused the detected degradation in echo canceller performance.

In another embodiment, the auxiliary sensor may be a heat sensor, and the non-acoustic physical event that is detected may be a new heat source or a change in a detected heat level from a known heat source. These may indicate a new intervening person proximate to the device or movement of a person (e.g. the device user) relative to the heat sensor, respectively. In these situations, the determination of whether signal processor recalibration is required may be performed similarly to which is described above with respect to the proximity sensor embodiment. More specifically, the determination of whether signal processor recalibration is required may depend upon the nature of the signal processor in question and the nature of detected event.

For example, if the signal processor is part of a beamformer 180, then signal processor recalibration (e.g. beamformer reconvergence) is not necessarily warranted for a new heat-emitting object, because detection of the new heat-emitting object does not necessarily indicate whether that object should be treated as the dominant audio source. Conversely, if the heat sensor has detected a change in detected heat of a known heat source (typically indicating a change in proximity of the known heat source from the sensor and thus the device 100, given that the heat sensor is fixed within/to the device), and it is suspected that the object is the face of the device user, then recalibration of the signal processor (re-steering of the beamformer) may in fact be warranted. Alternatively, if the signal processor is part of a echo canceller, then signal processor recalibration (echo canceller reconvergence) may in fact be warranted for either a newly detected heat-emitting object or a change in detected heat level of a known heat source, because each of those circumstances may have changed the reflecting surfaces in the acoustic environment of the mobile device and may thus have been responsible for a detected degradation in echo canceller performance (operation 904, FIG. 9). Operation 900 thus terminates.

The above embodiments describe use of a microphone array 115, 710 comprising at least two microphones. It will be appreciated that the number of microphones in a microphone array may be greater than two in alternative embodiments. In general, the greater the number of microphones in the array, the greater the possible degree of precision in detecting directions of arrival, such as directions A1 and A2. Any type of audio input transducers (whether microphones or otherwise) could be used in a microphone array.

In some embodiments, the auxiliary sensor 109, 714 or 814 may comprise a combinations of two or more different types of the sensors described herein (e.g. motion sensors, proximity sensors, heat sensors, etc.). The use of multiple sensor types may provide more information for disambiguation purposes. Possible combinations of sensors may include an accelerometer, gyroscope and magnetometer (i.e. compass), which may facilitate determining the absolute 3D orientation of the device in space, e.g. to detect whether the device is at rest or in motion, up to a user's face, or on a surface such as a table top. Another possible combination may be a motion sensor and camera with a face detection capability, the latter for determining whether the user's face is moving with the device. For example, if the face of the user is moving with the device, beamformer reconvergence (as an example) may not be required because the DOA of the user's voice at the microphone(s) will likely be unchanged. Conversely, if the user's face has not moved relative to the device (e.g. a hands-free configuration in which the user is looking into a device camera, such as during a video chat), beamformer reconvergence may not be warranted.

It will be appreciated that the acoustic environment 200 in some embodiments may comprise a different number of audio sources (including none) and a different number of reflecting surfaces (including none) than what is illustrated in FIG. 1. For example, in some embodiments the acoustic environment may comprise one or more audio sources but no reflecting surfaces, while in other embodiments the acoustic environment may comprise one or more reflecting surfaces but no audio sources.

In some embodiments, the types of acoustic environment changes that could be detected may differ from those discussed above, and the auxiliary sensors used to detect them may also differ from those discussed above.

For instance, changes in a character, quality or nature of the detected audio input (e.g. type of sound or noise) may be estimated or ascertained by analyzing a microphone signal. For example, when a characteristic of detected sound or noise changes so as to suggest a particular physical environment (e.g. a crowded public interior space such as a mall or a moving vehicle), this suggestion could potentially be disambiguated by GPS or accelerometer readings that may be used to determine the user's location (e.g. in a mall) and/or movement (e.g. on a moving train or in another type of moving vehicle). This may in return facilitate identification of a likely background noise to be filtered out. This may be referred to as "noise classification."

In general, the beamformer 180, echo canceller 190 and any other signal processor component referenced above may be implemented in software, hardware, firmware, or any suitable combination thereof.

It will be appreciated that the terms "microphone" and "microphone array" refer to a wide range of audio input transducers, and are not necessarily limited to only the types of microphones that are commonly used in consumer electronic devices. These terms may alternatively refer to other sensors including, among others, gramophone pickups, hydrophones, or the like.

In some embodiments, a method of performing acoustic echo cancellation at a mobile device may simply comprise the following. Using an acoustic echo canceller, acoustic echo cancellation is performed upon audio input received at a microphone of the mobile device. Based at least in part upon on a detected motion of the mobile device, the acoustic echo canceller is caused to converge (or reconverge). In such embodiments, the mobile device need not necessarily comprise an echo cancellation quality degradation detector or a module for determining whether echo cancellation quality degradation coincides with the detected motion. Rather, mere detection of motion of the mobile device, e.g. using a motion detector comprising the mobile device, may trigger the echo cancellation convergence or reconvergence. The mobile device in such embodiments may be any type of mobile device, including any of those enumerated above.

The operation of example mobile devices 100, 700 and 800 illustrated in FIGS. 1, 7 and 8 as described herein may be controlled, at least in part, by the execution of software or instructions by a processor (such as a digital signal processor or main CPU, for example) of the respective devices, which software or instructions may be loaded into device memory from a computer-readable medium 50, 720 or 820, as illustrated in FIGS. 1, 7 and 8, respectively. A non-exhaustive list of examples of computer-readable media has already been described.

In a multi-microphone device, it is possible to either use a single echo canceller, which may be located after a beamforming summing node for example, or to use one echo canceller per microphone.

The embodiments of the invention described above are intended to be exemplary only. The scope of the invention is intended to be limited solely by the scope of the claims.

What is claimed is:

1. A method of steering an audio beamformer of a mobile device, the method comprising:

based on audio input received at a microphone array of the mobile device, detecting a change in a direction of arrival of the audio input at a first time;

detecting a non-acoustic physical event at a second time using an auxiliary sensor at the mobile device;

determining that the first time of the change in the direction of arrival of the audio input coincides with the second time of the non-acoustic physical event; and in response to determining that the change in the direction coincides with the non-acoustic physical event, steering the audio beamformer in a changed direction of arrival of the audio input.

2. The method of claim 1 wherein the auxiliary sensor is a motion sensor and wherein the non-acoustic physical event is a motion of the mobile device and wherein steering the audio beamformer in the changed direction comprises causing the audio beamformer to recoverge;

the method further comprising comparing the changed direction to the determined motion of the mobile device to corroborate the changed direction.

3. The method of claim 1 wherein the auxiliary sensor is a proximity sensor and wherein the non-acoustic physical event is a change in a proximity of an object.

4. The method of claim 1 wherein the auxiliary sensor is a heat sensor and wherein the non-acoustic physical event is a change in an amount of heat emitted by a heat source.

5. A method of performing acoustic echo cancellation at a mobile device, the method comprising:

detecting at a first time a degradation in a quality of acoustic echo cancellation being performed by an acoustic echo canceller upon audio input received at a microphone of the mobile device;

detecting a non-acoustic physical event at a second time using an auxiliary sensor at the mobile device;

determining that the first time of the degradation in the quality of the acoustic echo cancellation coincides with the second time of the non-acoustic physical event;

in response to determining that the degradation in the quality of the acoustic echo cancellation coincides with a non-acoustic physical event, causing the acoustic echo canceller to reconverge.

6. The method of claim 5 wherein the detecting of the degradation in the quality of acoustic echo cancellation comprises determining that an Echo Return Loss Enhancement (ERLE) measure has dropped below a threshold value.

7. The method of claim 5 wherein the auxiliary sensor is a motion sensor and wherein the non-acoustic physical event is a motion of the mobile device.

8. The method of claim 5 wherein the auxiliary sensor is a proximity sensor and wherein the non-acoustic physical event is a newly detected proximate object or a detected change in a proximity of an object.

9. The method of claim 5 wherein the auxiliary sensor is a heat sensor and wherein the non-acoustic physical event is a newly detected heat source or a detected change in an amount of heat emitted by a heat source.

10. A mobile device comprising a microphone array, an audio beamformer and an auxiliary sensor, the mobile device being operable to:

based on audio input received at the microphone array, detect a change in a direction of arrival of the audio input at a first time;

detect a non-acoustic physical event at a second time using an auxiliary sensor at the mobile device;

determine that the first time of the detected change in the direction of arrival of the audio input coincides with the first time of the non-acoustic physical event; and in response to determining that the change in the direction coincides with the non-acoustic physical event, steer the audio beamformer in a changed direction of arrival of the audio input.

11. The mobile device of claim 10 wherein the auxiliary sensor is a motion sensor and wherein the non-acoustic physical event is a motion of the mobile device and wherein steering the audio beamformer in the changed direction comprises causing the audio beamformer to recoverge;

the mobile device being further operable to compare the changed direction to the determined motion of the mobile device to corroborate the changed direction.

12. The mobile device of claim 10 wherein the auxiliary sensor is a proximity sensor and wherein the non-acoustic physical event is a change in a proximity of an object.

13. The mobile device of claim 10 wherein the auxiliary sensor is a heat sensor and wherein the non-acoustic physical event is a change in an amount of heat emitted by a heat source.

14. A mobile device comprising a microphone, an acoustic echo canceller and an auxiliary sensor, the mobile device being operable to:

detect at a first time a degradation in a quality of acoustic echo cancellation being performed by the acoustic echo canceller upon audio input received at the microphone;

detect a non-acoustic physical event at a second time using an auxiliary sensor at the mobile device;

determine that the first time of the degradation in the quality of the acoustic echo cancellation coincides with the second time of the non-acoustic physical event; and based on the determining, cause the acoustic echo canceller to reconverge.

15. The mobile device of claim 14 wherein the detecting of the degradation in the quality of acoustic echo cancellation comprises determining that an Echo Return Loss Enhancement (ERLE) measure has dropped below a threshold value.

16. The mobile device of claim 14 wherein the auxiliary sensor is a motion sensor and wherein the non-acoustic physical event is a motion of the mobile device.

17. The mobile device of claim 14 wherein the auxiliary sensor is a proximity sensor and wherein the non-acoustic physical event is a newly detected proximate object or a detected change in a proximity of an object.

18. The mobile device of claim 14 wherein the auxiliary sensor is a heat sensor and wherein the non-acoustic physical event is a newly detected heat source or a change in an amount of heat emitted by a heat source.

* * * * *